United States Patent
Reibling et al.

(10) Patent No.: US 10,371,181 B1
(45) Date of Patent: Aug. 6, 2019

(54) TRACTION BATTERY ENCLOSURE CLAMPING DEVICE AND SECURING METHOD

(71) Applicant: Ford Global Technologies, LLC, Dearborn, MI (US)

(72) Inventors: Michael E. Reibling, Sterling Heights, MI (US); Kevin A. Montgomery, Royal Oak, MI (US); Brock Dunlap, Dearborn, MI (US); Samir Subba, Dearborn, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/946,817

(22) Filed: Apr. 6, 2018

(51) Int. Cl.
| | | |
|---|---|---|
| *B60K 1/04* | (2019.01) | |
| *F16B 2/02* | (2006.01) | |
| *H01M 2/10* | (2006.01) | |

(52) U.S. Cl.
CPC ............ *F16B 2/02* (2013.01); *B60K 1/04* (2013.01); *H01M 2/1077* (2013.01); *H01M 2/1083* (2013.01)

(58) Field of Classification Search
CPC ...................................................... B60K 1/04
See application file for complete search history.

(56) References Cited

U.S. PATENT DOCUMENTS

| | | | |
|---|---|---|---|
| 6,109,380 A | 8/2000 | Veenstra | |
| 6,410,185 B1* | 6/2002 | Takahashi | B60K 6/28 |
| | | | 429/163 |
| 9,468,116 B2 | 10/2016 | Voss | |
| 9,553,343 B2* | 1/2017 | Malcolm | |
| 9,577,284 B2 | 2/2017 | Andreas-Schott et al. | |
| 9,601,723 B2 | 3/2017 | Nielsen | |
| 2010/0136402 A1 | 6/2010 | Hermann et al. | |
| 2018/0026238 A1 | 1/2018 | Andou et al. | |

FOREIGN PATENT DOCUMENTS

WO 2011153312 12/2011

* cited by examiner

*Primary Examiner* — James A Shriver, II
*Assistant Examiner* — James J Triggs
(74) *Attorney, Agent, or Firm* — Carlson, Gaskey & Olds, P.C.

(57) ABSTRACT

An exemplary battery assembly includes first and second pieces of an enclosure, a flange of the first piece, and a clamping device compressing together the flange and a portion of the second piece to seal an interface. The clamping device has an interior area that receives the flange such that the clamping device extends continuously from a first side, about an outer edge, to an opposite, second side of the flange. An exemplary battery enclosure securing method includes receiving a flange of a first enclosure piece within an open area of a clamping device while the clamping device compresses together the flange and a portion of a second enclosure piece. The clamping device extends continuously from a first side of the flange, about an outer edge of the flange, to an opposite, second side of the flange when the flange is received within the open area.

20 Claims, 7 Drawing Sheets

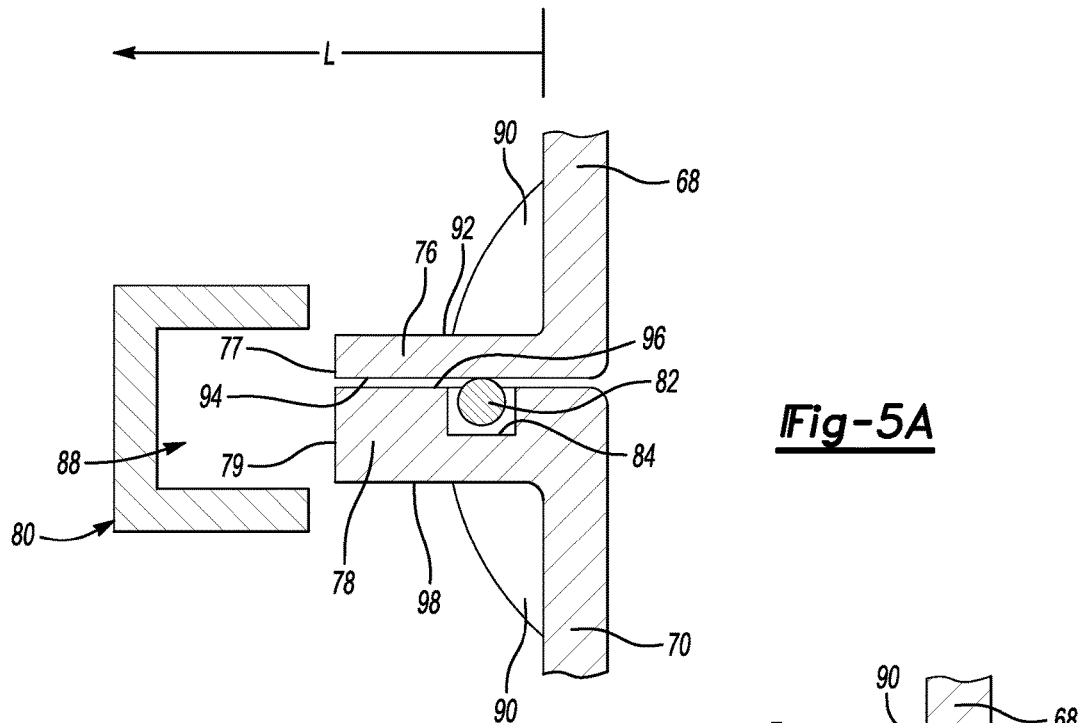
*Fig-5A*
*Fig-5B*
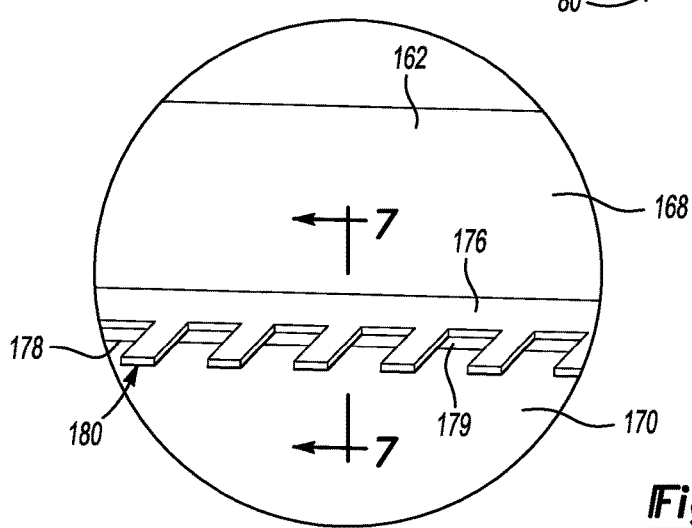
*Fig-6*

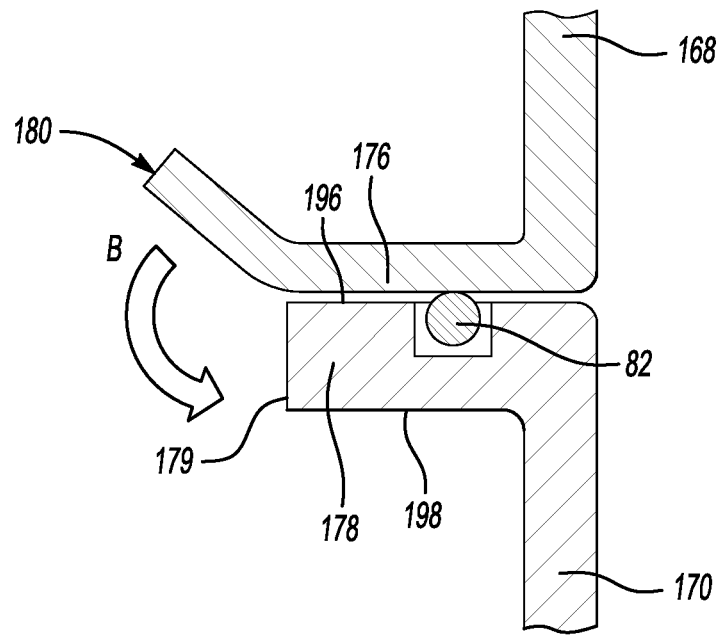
_Fig-7A_
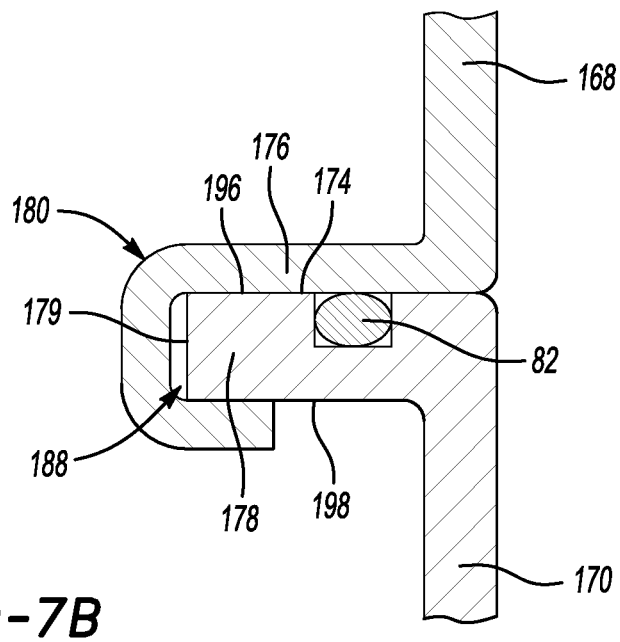
_Fig-7B_

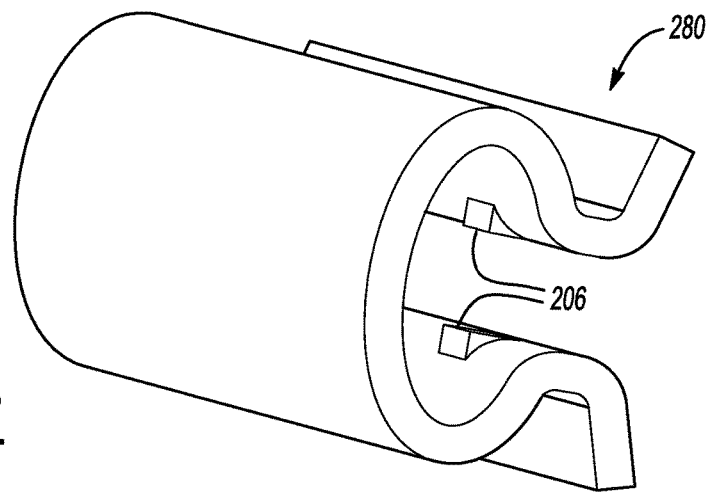
_Fig-8_
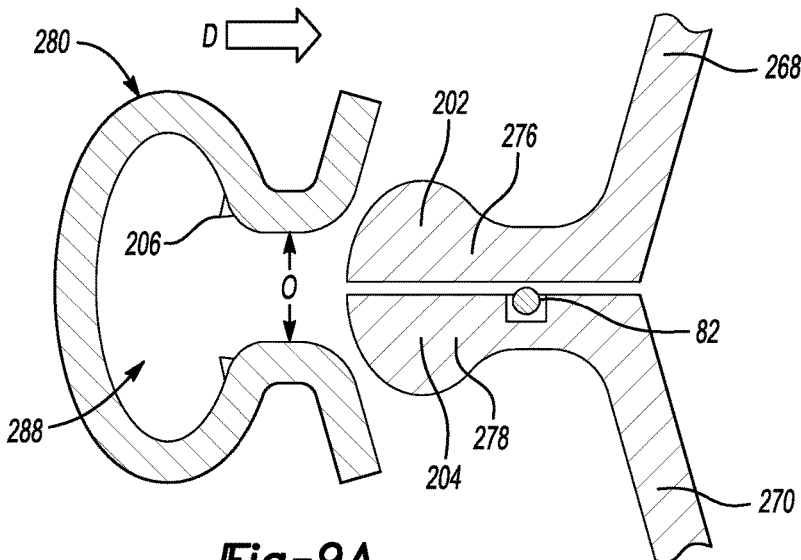
_Fig-9A_
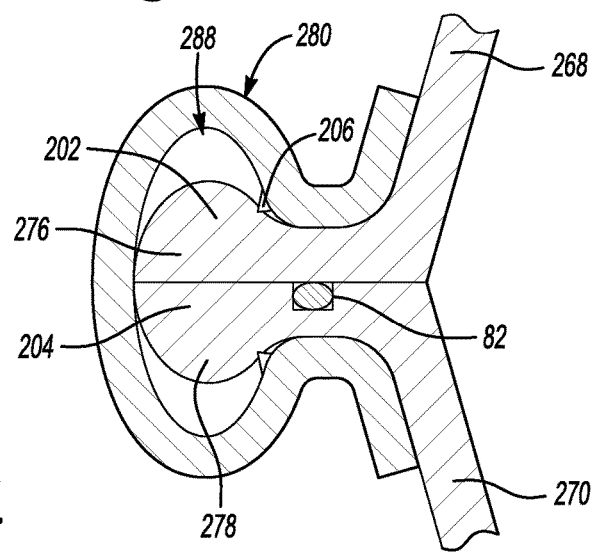
_Fig-9B_

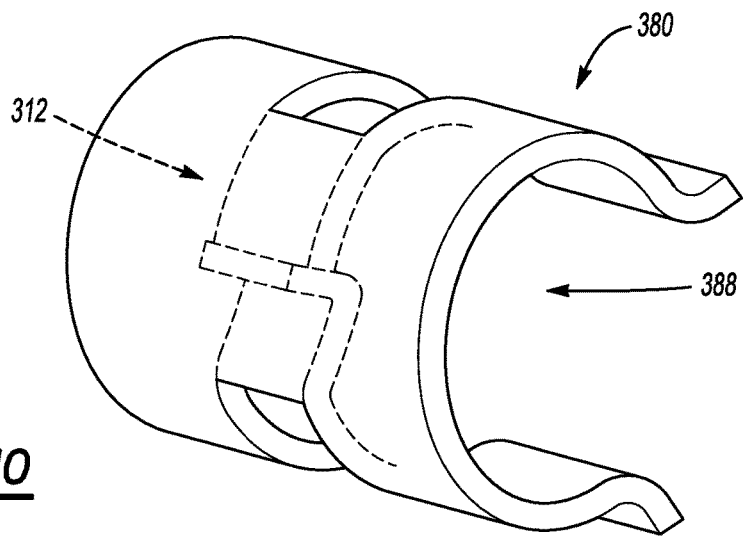
Fig-10
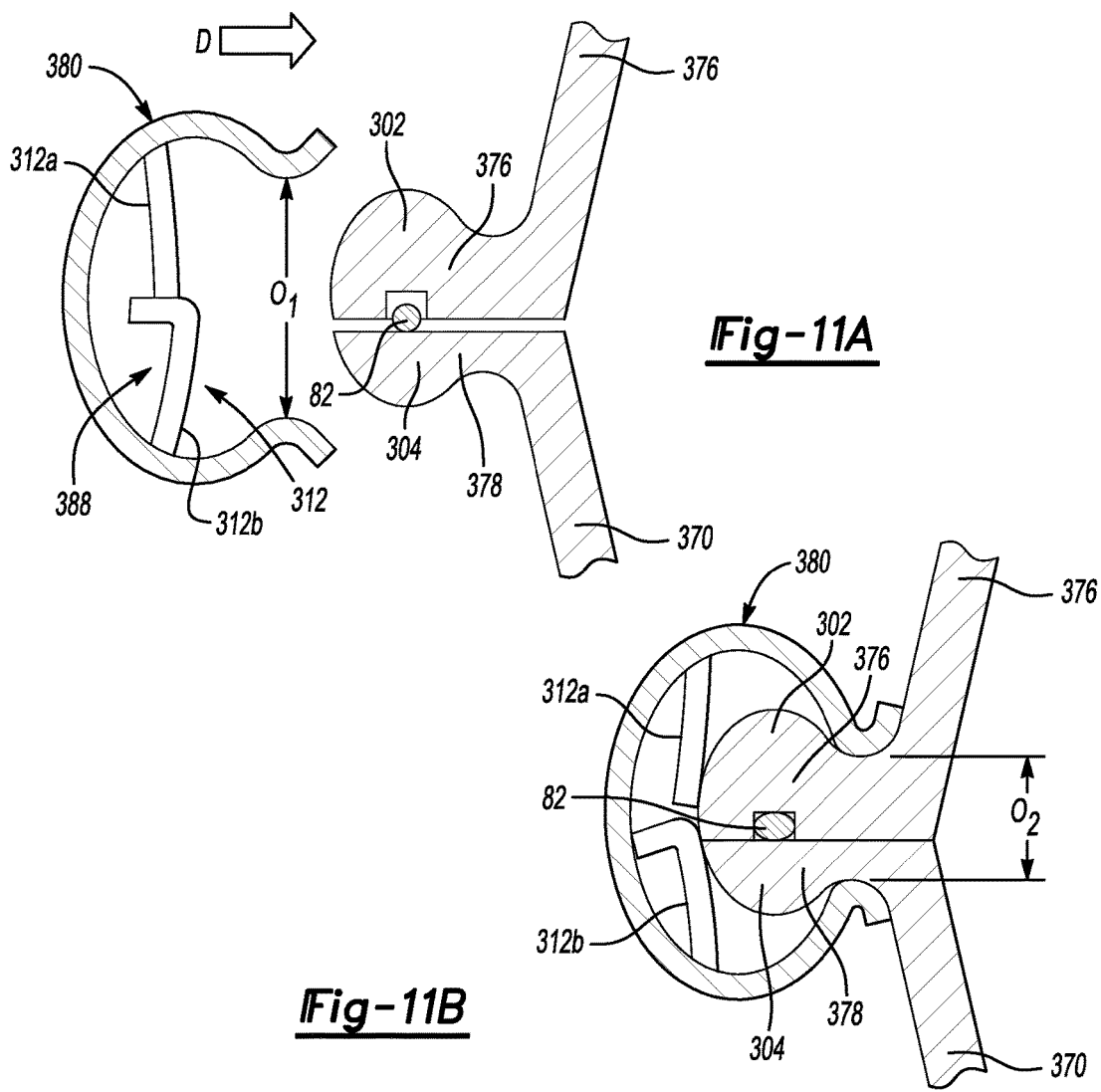
Fig-11A
Fig-11B

TRACTION BATTERY ENCLOSURE CLAMPING DEVICE AND SECURING METHOD

TECHNICAL FIELD

This disclosure relates generally to securing pieces of a traction battery enclosure and, more particularly, to securing the pieces using a clamping device.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source.

The traction battery can include an enclosure for housing the battery arrays. The enclosure can include multiple pieces that are secured together using mechanical fasteners. The mechanical fasteners require significant packaging space.

SUMMARY

A battery assembly according to an exemplary aspect of the present disclosure includes, among other things, first and second pieces of an enclosure, a flange of the first piece, and a clamping device compressing together the flange and a portion of the second piece to seal an interface between the first and second pieces. The clamping device has an interior area that receives the flange such that the clamping device extends continuously from a first side, about an outer edge, to an opposite, second side of the flange.

In a further non-limiting embodiment of the foregoing assembly, the first piece is one of an enclosure lid or an enclosure tray, and the second piece is the other of the enclosure lid or the enclosure tray. The enclosure tray and the enclosure lid together enclose a traction battery array within an open area.

In a further non-limiting embodiment of any of the foregoing assemblies, the flange projects outward away from the open area and terminates at the outer edge.

In a further non-limiting embodiment of any of the foregoing assemblies, the clamping device is crimped to both the flange and the portion to compress together the flange and the portion.

A further non-limiting embodiment of any of the foregoing assemblies includes a seal at the interface. The seal is compressed when the clamping device compresses together the flange and the portion of the second piece.

In a further non-limiting embodiment of any of the foregoing assemblies, the clamping device is separate and distinct from both the first and the second pieces.

In a further non-limiting embodiment of any of the foregoing assemblies, the flange is a first flange, and the portion of the second piece is a second flange. The clamping device extends continuously from a first side of the second flange, about an outer edge of the second flange, to an opposite, second side of the second flange.

In a further non-limiting embodiment of any of the foregoing assemblies, the clamping device is a clip. The clip is configured to be press-fit over the first and second flanges to transition the clip to an installed position where the clip compresses together the first and second flanges.

In a further non-limiting embodiment of any of the foregoing assemblies, an enlarged area of at least one of the first and second flanges is received within the interior area of the clip when the clip is in the installed position. The enlarged area blocks a transition of the clip from the installed position.

In a further non-limiting embodiment of any of the foregoing assemblies, the clamping device is a clip having a trigger. The clip is held by the trigger in an expanded position when the trigger is set. The clip is moveable to a clamped position when the trigger is released. The trigger is configured to release in response to at least one of the first or second flanges contacting the trigger as the first and second flanges are moved relative to the clip into the interior area.

In a further non-limiting embodiment of any of the foregoing assemblies, the clamping device is a clip. The battery assembly further includes an insert disposed within the interior area of the clip that is separate from the clip. The clip is held by the insert in an expanded position when the insert is set. The clip is moveable to a clamped position when the insert is released. The insert is configured to release in response to at least one of the first or second flanges contacting the insert as the first and second flanges are moved relative to the clip into the interior area.

In a further non-limiting embodiment of any of the foregoing assemblies, the clamping device is a continuous monolithic portion of the second piece.

A battery enclosure securing method according to another exemplary aspect of the present disclosure includes, among other things, receiving a flange of a first enclosure piece within an open area of a clamping device while the clamping device compresses together the flange and a portion of a second enclosure piece. The clamping device extends continuously from a first side of the flange, about an outer edge of the flange, to an opposite, second side of the flange when the flange is received within the open area.

In a further non-limiting embodiment of the foregoing method, the compressing seals an interface between the flange and the portion.

A further non-limiting embodiment of any of the foregoing methods includes crimping the clamping device to compress together the flange and a portion of the second enclosure piece.

In a further non-limiting embodiment of any of the foregoing methods, the clamping device is separate and distinct from both the first and second pieces.

In a further non-limiting embodiment of any of the foregoing methods, the flange is a first flange, and the portion of the second piece is a second flange. The method further includes receiving the second flange within the open area while the clamping device compresses together the first and second flanges. The clamping device extends continuously from a first side of the second flange, about an outer edge of the second flange, to an opposite, second side of the second flange.

A further non-limiting embodiment of any of the foregoing methods includes press-fitting the clamping device over the over the first and second flanges during the receiving to transition the clamping device to an installed position where the clamping device compresses together the first and second flanges.

A further non-limiting embodiment of any of the foregoing methods includes blocking a transition of the clamping device from the installed position using an enlarged area of at least one of the first and second flanges that is received within the interior area of the clamping device when the clamping device is in the installed position.

A further non-limiting embodiment of any of the foregoing methods includes releasing the clamping device from an expanded position to a clamped position when positioning the first and second flanges within the open area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5A illustrates a section view taken at line 5-5 in FIG. 4 prior to installing the associated clamping device.

FIG. 5B illustrates the view of FIG. 5A when the clamping device is in an installed position compressing together pieces of the enclosure.

FIG. 6 illustrates a perspective view of an enclosure according to another exemplary aspect of the present disclosure where the clamping device is integrated into a piece of the enclosure and prior to moving the clamping device to an installed position.

FIG. 7A illustrates a section view taken at line 7-7 in FIG. 6.

FIG. 7B illustrates the section view of FIG. 7A when the clamping device is in an installed position compressing together pieces of the enclosure.

FIG. 8 illustrates a perspective view of a clamping device according to yet another exemplary aspect of the present disclosure.

FIG. 9A illustrates a section view of the clamping device of FIG. 8 and an enclosure prior to moving the clamping device to an installed position.

FIG. 9B illustrates the section view of FIG. 9A when the clamping device is in the installed position compressing together pieces of the enclosure.

FIG. 10 illustrates a perspective view of a clamping device according to yet another exemplary aspect of the present disclosure.

FIG. 11A illustrates a section view of the clamping device of FIG. 10 and an enclosure prior to moving the clamping device to an installed position.

FIG. 11B illustrates the section view of FIG. 11A when the clamping device is in the installed position compressing together pieces of the enclosure.

DETAILED DESCRIPTION

This disclosure relates generally to assembling pieces of a battery pack enclosure. In particular, the disclosure details exemplary clamping devices and securing methods that compress together pieces of the traction battery pack enclosure. Compressing the pieces together can seal an interface between the pieces. The clamping devices require less area to secure the pieces than, for example, a threaded mechanical fastener.

Figure 1:
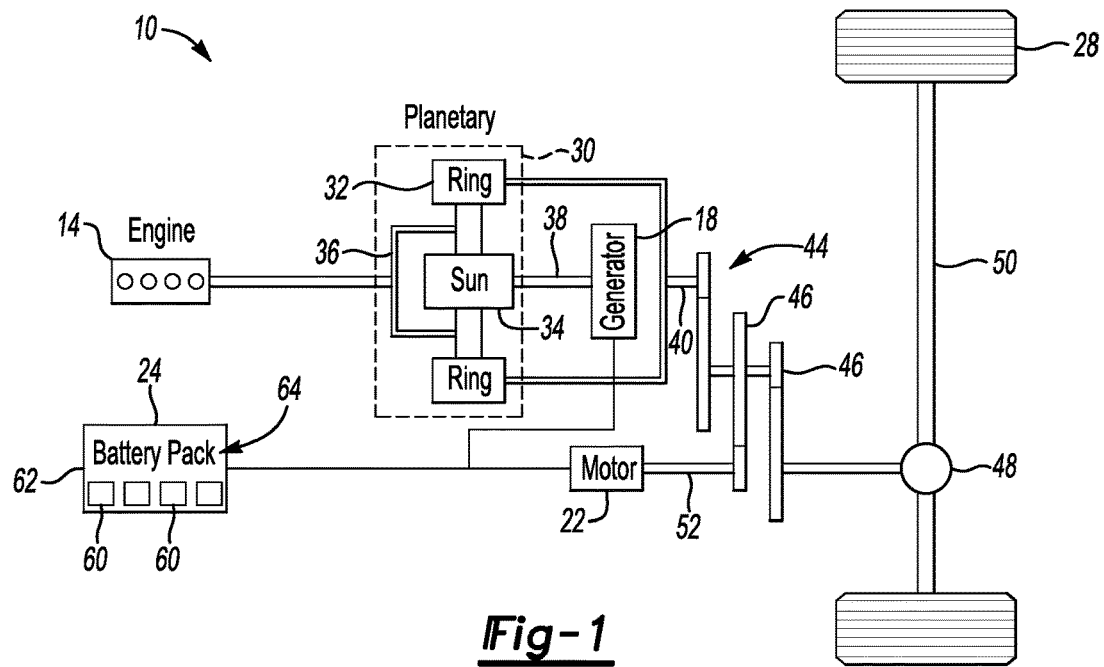
FIG. 1 illustrates a schematic view of a powertrain of an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to propel the wheels 28. The battery pack 24 can include a plurality of arrays 60 of individual battery cells held within an enclosure 62.

Figure 2:
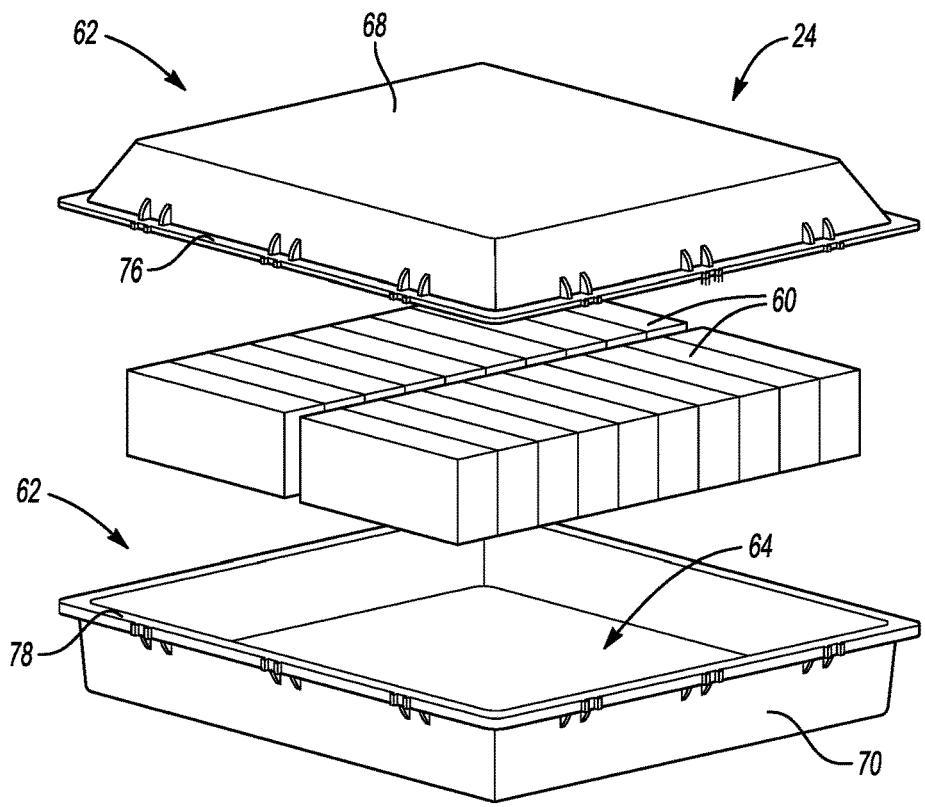
FIG. 2 illustrates an expanded view of selected portions of a battery pack from the powertrain of FIG. 1.
Figure 3:
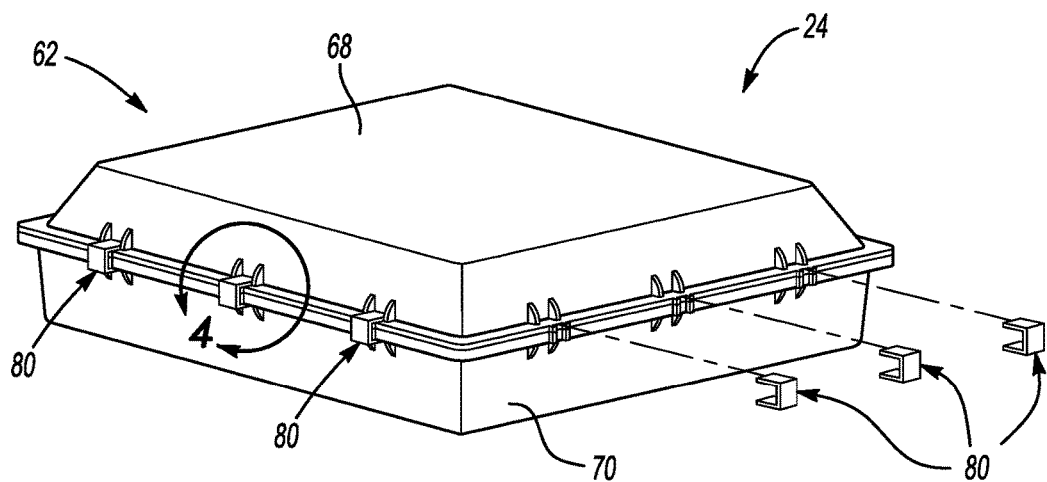
FIG. 3 illustrates clamping devices securing pieces of an enclosure from the battery pack of FIG. 2.
Figure 4:
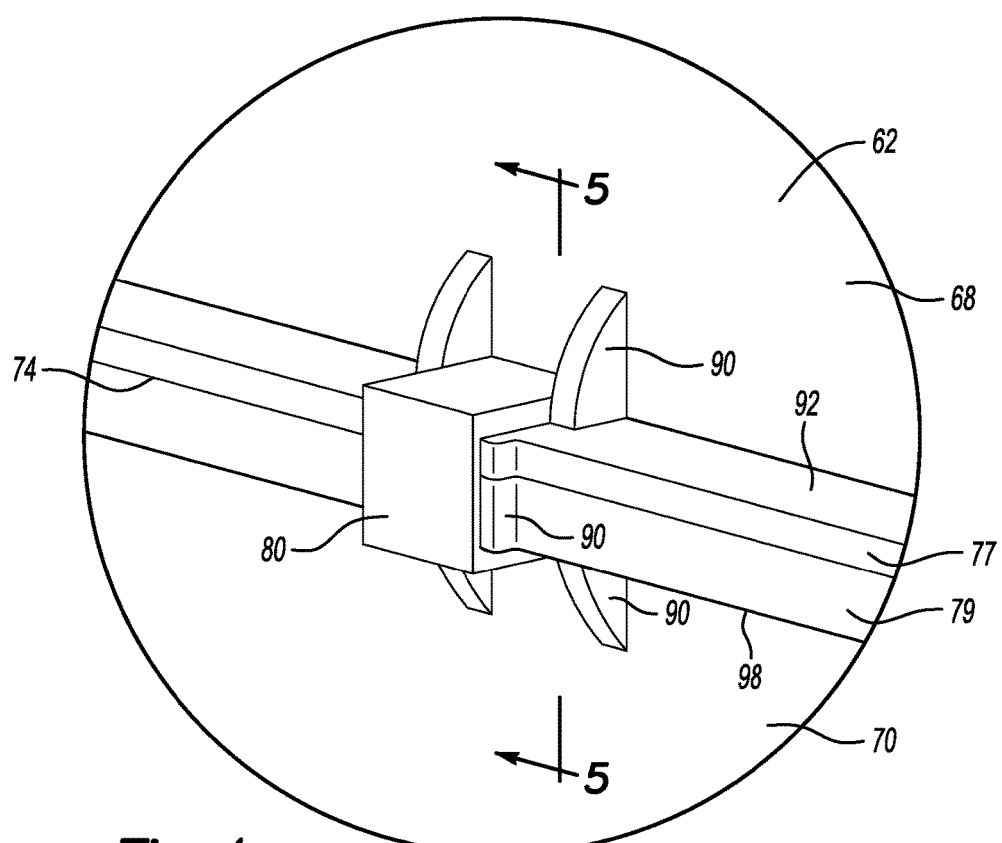
FIG. 4 illustrates a close-up view of Area 4 in FIG. 3.

With reference now to FIGS. 2-4, the enclosure 62 of the battery pack 24 provides an open area 64 that holds the arrays 60 of individual battery cells. The open area 64 can hold other components of the battery pack 24, such as electronic components, control modules, etc.

The enclosure 62 includes a plurality of pieces. In the exemplary embodiment, one of the enclosure pieces is an enclosure lid 68 and another of the pieces is an enclosure tray 70. The lid 68 is secured to the tray 70 to enclose the arrays 60 within the open area 64. Although the exemplary enclosure 62 includes two pieces (i.e., the lid 68 and the tray 70) other enclosures could include other numbers of pieces.

When the lid 68 is secured relative to the tray 70, the lid 68 is compressed against the tray 70 along an interface 74. In the exemplary embodiment, the interface 74 extends circumferentially continuously about the open area 64.

The lid 68 includes a flange 76 extending outward from the open area 64 to an outermost edge 77, which, in this example, represents the outermost portion of the lid 68. The tray 70 includes a flange 78 extending outward from the open area 64 to an outermost edge 79, which, in this example, represents the outermost portion of the tray 70. The flanges 76 and 78 provide the interface 74 in this example. The flanges 76 and 78, when the lid 68 is secured to the tray 70, extend away from the open area 64 and are disposed outside the open area 64.

In an exemplary non-limiting embodiment, the lid 68 and the tray 70 can be a polymer-based material. The lid 68 and the tray 70 could instead be a metal or metal alloy material such as aluminum. In some examples, the one of the lid 68 or the tray 70 is a polymer-based material and the other of the lid 68 or the tray 70 is a metal or metal alloy.

The flange 76 can be a continuous and uninterrupted integral portion of the lid 68. Also, the flange 78 can be a continuous and uninterrupted integral portion of the tray 70. That is, the lid 68 can be formed to include the flange 76, and the tray 70 formed to include the flange 78.

With reference now to FIGS. 3, 4, 5A, and 5B, clamping devices 80 are used to secure the lid 68 to the tray 70. When in an installed position, the clamping devices 80 compress the flange 76 of the lid 68 against the flange 78 of the tray 70. FIG. 3 shows some of the clamping devices 80 in an installed position and some of the clamping devices 80 in an uninstalled position.

The clamping devices 80 in the installed position seal the interface 74. In the exemplary non-limiting embodiment, the sealing is provided by, among other things, a seal 82. The clamping devices 80 in the installed position compresses the seal 82, which seals the interface 74.

The seal 82, in the exemplary non-limiting embodiment, is disposed within a groove 84 of the tray 70. The seal 82 could instead, or additionally, be positioned within a groove of the lid 68. The seal 82 could also be positioned outside of any groove and placed on a surface of the lid 68 or the tray 70. The seal 82 can be a polymeric bead seal. In a specific non-limiting exemplary embodiment, the seal 82 is a Room-Temperature-Vulcanizing (RTV) silicone seal.

The clamping device 80 has a "C" shaped profile having an interior area 88. Clamping devices having interior areas provided by other profiles are possible and could be used in other examples.

The clamping device 80 generally is moved to the installed position by positioning a portion of the flanges 76 and 78 within the interior area 88 of the clamping device 80. Then, as shown in FIG. 5B, force F is applied to crimp the clamping device 80. The crimping bends and deforms the clamping device 80 to reduce a size of the interior area 88, which compresses the flange 76 against the flange 78 and the seal 82. A person having skill in this art could understand how to crimp a component. A hand tool, for example, could be used to crimp the clamping device 80.

The plurality of the clamping devices 80 are distributed circumferentially about a periphery of the enclosure 62. The lid 68 and the tray 70 can be formed to include locating features such as ribs 90 which help to align the clamping device 80 when crimping the clamping device 80 onto the flange 76 and the flange 78.

The clamping device 80 is a metal or metal alloy, or another material that can substantially retain its shape after crimping. Thus, after applying and removing the force F as shown in FIG. 5B, the clamping device 80 maintains itself in the installed position where the clamping device 80 compresses the flange 76 against the flange 78 and the seal 82.

The clamping device 80 is about 0.5 inches (12.7 millimeters) wide in this example. Three separate clamping devices 80 are disposed along each lateral side of the exemplary enclosure 62, although other numbers could be used.

When the clamping device 80 is in the installed position, the clamping device 80 extends continuously from a first side 92 of the flange 76, about the outermost edge 77 of the flange 76, to an opposing, second side 94 of the flange 76. Similarly, when the clamping device 80 is in the installed position of FIG. 5B, the clamping device 80 extends continuously from a first side 96 of the flange 78, about the outermost edge 79 of the flange 78, to a second side 98 of the flange 78. Extending the clamping device 80 continuously about the flanges 76 and 78 in this way captures the flanges 76 and 78 within the interior area 88 as the clamping device 80 is crimped to the flanges 76 and 78.

To instead use a threaded mechanical fastener assembly, such as a bolt and a nut, to compress together the flange 76 and the flange 78, the flanges 76 and 78 would need to extend laterally in a direction L further outward from the open area 64 and the remaining portions of the enclosure 62. The additionally flange area would be required to, among other things, provide an aperture that receives the threaded mechanical fastener. The threaded mechanical fastener assemblies would also not extend continuously from a first side of a flange, about an outermost edge, to an opposite, second side of the flange when the bolt is engaged with the nut as the bolt would extend through the aperture, and because the bolt and the nut are separate and distinct components. In some examples, using the clamping device 80 rather than a threaded mechanical fastener can reduce a size of the flanges 76 and 78 by 0.5 to 0.75 inches (12.7 to 19.05 millimeters) in the direction L.

Servicing components of the battery pack 24 within the enclosure 62 can involve bending the clamping devices 80 away from the installed position or cutting through the middle of the vertical section. This releases the clamp load on the flanges 76 and 78 and permits relative movement of the enclosure lid 68 away from the enclosure tray 70. After servicing the components is complete, the clamping devices 80 or new clamping devices can be moved to installed position.

In the exemplary embodiment, the clamping devices 80 secure the flanges 76 and 78 together, and the seal 82 seals the interface. The seal 82, in such the embodiment, may not significantly contribute to the securing together of the flanges 76 and 78. That is, the seal 82 may not provide a significant bond between the flanges 76 and 78.

In another exemplary, non-limiting embodiment, the seal 82 is an adhesive sealant that secures the flanges 76 and 78 together. In such an embodiment, the clamping devices 80 hold the flanges 76 and 78 together as the adhesive sealant cures to bond the flange 76 to the flange 78. However, after the adhesive sealant has cured to bond the flanges 76 and 78 together, the adhesive sealant, rather than the clamping devices 80, is primarily relied on to secure the flanges 76 and 78 together. The clamping device 80 thus act as a fixture that holds the flanges 76 and 78 in position as the adhesive sealant cures, but, after the adhesive cures, is not significantly relied on to hold the flanges 76 and 78 together. Using the clamping devices 80 as a fixture when curing the adhesive sealant may require fewer clamping devices 80 than if the clamping devices 80 are relied on to secure the flanges 76 and 78 together during operation. Using fewer clamping devices 80 can reduced an overall weight of the enclosure 62.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

With reference now to FIGS. 6, 7A, and 7B, another exemplary enclosure 162 can include a first piece that is the enclosure lid 168 and a second piece that is the enclosure tray 170. A clamping device 180 is formed as a continuous and monolithic portion of the lid 168.

In the exemplary embodiment, the lid 168 is a metal or metal alloy. The clamping device 180 can be bent in a direction B about the flange 178 of the tray 170 such that the clamping device 180 extends from a first side 196 of the flange 178, about an outermost edge of the flange 178 to an opposing, second side 198 of the flange 178. Because the lid 168 is a metal or metal alloy, the clamping device 180, after bending, retains the flange 178 within an open area 188 which compresses the flange 178 against the flange 176 of the lid 168 to seal an interface 174 between the lid 168 and the tray 170.

The clamping device 180 could be moved from the position of FIG. 7A to the position of FIG. 7B by a tool, such as a modified hand tool or automated crimping machine, for example.

Servicing the areas within the enclosure 162 can involve removing the flange 176 from the lid 168. After servicing, clamping device like those described in connection with the embodiment of FIGS. 2-5B could be used to reattach the lid 168 to the tray 170.

With reference now to FIGS. 8, 9A, and 9B, the clamping device 280, according to another exemplary aspect of the present disclosure, has the form of a clip. The clip can be press-fit over the flange 276 of the lid 268 and the flange 278 of the tray 270 to position the flanges 276 and 278 within an interior area 288 of the clamping device 280.

The clamping device 280 extends continuously from first sides of the flanges 276, about outermost edges of the flanges, to opposing, second sides of the flanges 278 when the clamping device 280 is in the installed position of FIG. 9B.

The clamping device 280 is biased to the position of FIG. 9A, the biasing force of the clamping device 280 compresses the flange 276 against the flange 278 when the clamping device 280 is in the installed position of FIG. 9B.

In this example, the flange 276 includes an enlarged area 202, and the flange 278 includes an enlarged area 204. As shown, the enlarged areas 202 and 204 are thicker than other areas of the flanges 276 and 278. As the clamping device 280 is moved in a direction D from the uninstalled position of FIG. 9A to the installed position of FIG. 9B, the clamping device 280 contacts the enlarged areas 202 and 204, which spreads open the clamping device 280 to increase a size of an opening O such that the enlarged areas 202 and 204 can fit within the interior area 288 of the clamping device 280. The clamping device 280 could be moved in the direction D manually or by a tool.

When the clamping device 280 is in the installed position of FIG. 9B, the enlarged areas 202 and 204 block movement of the clamping device 280 from the installed position. Further, in the exemplary embodiment, the clamping device 280 includes teeth 206. The teeth 206 can bite into the material of the flanges 276 and 278 when the clamping device 280 is in the installed position of FIG. 9B to further inhibit movement of the clamping device 280 from the installed position of FIG. 9B. The teeth 206 can block the clamping device 280 from popping off of the flanges 276 and 278.

With reference now to FIGS. 10, 11A, and 11B, another exemplary clamping device 380 is a clip having a trigger 312. The trigger 312 holds the clamping device 380 in an expanded, pretensioned position when the trigger 312 is set as shown in FIGS. 10 and 11A. To hold the clip, the trigger 312 rests an upper tab 312a of the trigger on a lower tab 312b of the trigger 312. The expanded position holds an opening of the clip at a first distance $O_1$, which permits the clamping device 380 to move over enlarged areas 302 and 304 of the flange 376 and the flange 378 respectively.

After the clamping device is moved sufficiently in a direction D, the flange 376 of the lid 368, the flange 378 of the tray 370, or both, contact the trigger 312 to transition the trigger 312 from the set position of FIG. 11A to the released position of FIG. 11B. The contact moves the upper tab 312a off of the lower tab 312b to release the trigger.

The clamping device 380 is biased toward a position that compresses the flange 376 against the flange 378 as shown in FIG. 11B. When the trigger 312 is released, the clamping device 380 moves to the position of FIG. 11B were the opening of the clip is reduced to a second distance $O_2$, which is less than the first distance $O_1$.

The trigger 312 generally includes portions of the clip that are bent up into an interior area 388 of the clip. Positioning the portions as shown in FIG. 11A clamping device 380 in the expanded position due to contact between the portions.

The positioning of the flanges 376 and 378 moves the portions out of contact with one another causing the clamping device 380 to snap into the clamped position of FIG. 11B.

Figure 12:
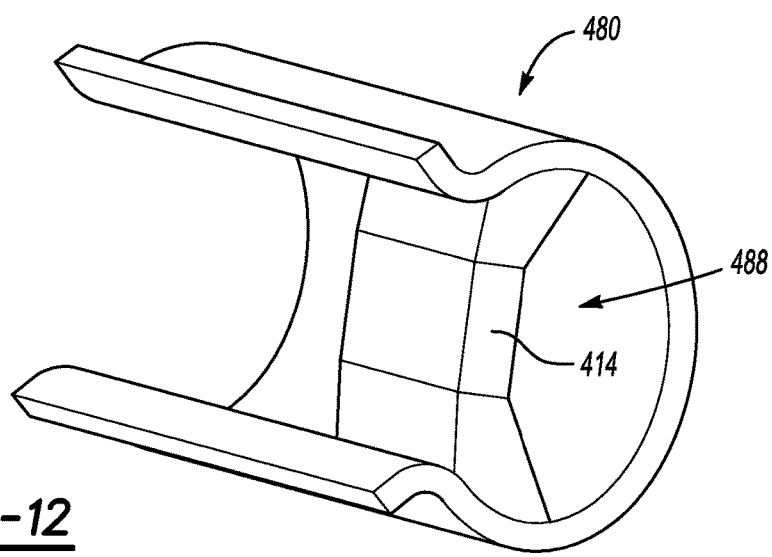
FIG. 12 illustrates a perspective view of a clamping device according to yet another exemplary aspect of the present disclosure
Figure 13A:
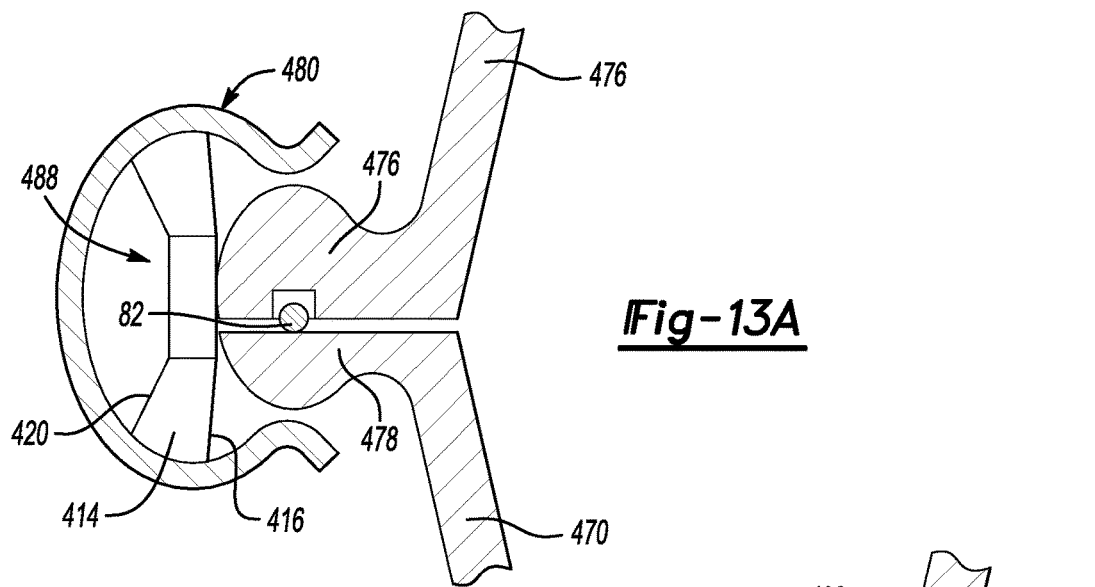
FIG. 13A illustrates a section view of the clamping device of FIG. 12 and an enclosure prior to moving the clamping device to an installed position.
Figure 13B:
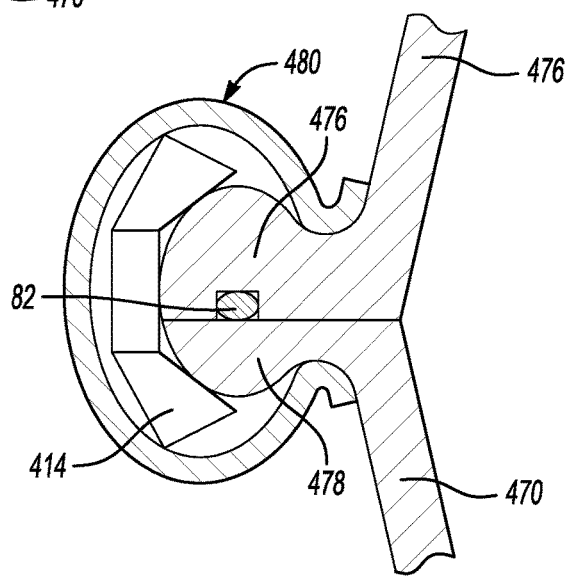
FIG. 13B illustrates the section view of FIG. 13A when the clamping device is in the installed position compressing together pieces of the enclosure.

With reference now to FIGS. 12, 13A, and 13B, yet another example clamping device 480 is used in connection with an insert 414. The insert 414 can be disposed within the interior area 488 of the clamping device to hold the clamping device 480, which is a clip, in the expanded position of FIGS. 12 and 13A. The insert 414 can be a polymer, or polymer-based insert that is a separate and distinct component from the clip portion of the clamping device 480. The insert 414, when positioned as shown in FIGS. 12 and 13A holds the clamping device 480 in an expanded position. In this position, the insert 414 has a relatively high column strength, which keeps the clamping device 480 in the expanded position.

The insert 414, when viewed in FIG. 13A, has relatively straight walls on a side 416 of the insert facing the flange 476 of the lid 468 and the flange 478 of the tray 470, and angled walls on an opposing, second side 420 of the insert 414. The straight walls versus the angled walls result in a relatively small bending moment that biases the insert 414 into the position of FIG. 13A. Moving the flanges 476, 478, or both against the side 416 of the insert 414 as the flanges 476 and 478 are moved into the interior area 488 overcomes the bending moment causing the insert 414 to move to the released position of FIG. 13B, where the insert 414 no longer holds the clamping device 480 in the expanded position. The clamping device 480 is biased toward the position of FIG. 13B, which is an installed position. Thus, after releasing the insert 414, the clamping device 480 moves to the position of FIG. 13B where the clamping device 480 compresses the flange 476 against the flange 478.

The exemplary clamping devices of this disclosure as shown as securing an enclosure tray relative to an enclosure lid. In other examples, the clamping devices could secure other enclosure pieces together, such as using the clamping devices to secure a fluid jacket of an enclosure to a tray of the enclosure.

Features of the disclosed examples include clamping devices that can secure pieces of a battery enclosure. The clamping devices interface with at least one flange of the battery enclosure to seal the enclosure. The flange used in connection with the clamping device can be smaller than a flange used in connection with a threaded mechanical fastener. The threaded mechanical fastener could require an aperture in the flange, which the clamping device does not. The threaded mechanical fastener could require machining operations to form threads, which the clamping device does not. Also, the clamping device may be secured with a faster cycle time than the threaded mechanical fastener, and may provide more uniform seal compression than the threaded mechanical fastener.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   first and second pieces of an enclosure;
   a flange of the first piece; and
   a clamping device compressing together the flange and a portion of the second piece to seal an interface between the first and second pieces, and having an interior area that receives the flange such that the clamping device extends continuously from a first side, about an outer edge, to an opposite, second side of the flange,
   wherein the flange is a first flange, and the portion of the second piece is a second flange, the clamping device extending continuously from a first side of the second flange, about an outer edge of the second flange, to an opposite, second side of the second flange,
   wherein the clamping device is a clip having a trigger, the clip held by the trigger in an expanded position when the trigger is set, the clip moveable to a clamped position when the trigger is released, wherein the trigger is configured to release in response to at least one of the first or second flanges contacting the trigger as the first and second flanges are moved relative to the clip into the interior area.

2. The battery assembly of claim 1, wherein the first piece is one of an enclosure lid or an enclosure tray, and the second piece is the other of the enclosure lid or the enclosure tray, the enclosure tray and the enclosure lid together enclosing a traction battery array within an open area.

3. The battery assembly of claim 2, wherein the flange projects outward away from the open area and terminates at the outer edge.

4. The battery assembly of claim 1, wherein the clamping device is crimped to both the flange and the portion to compress together the flange and the portion.

5. The battery assembly of claim 1, further comprising a seal at the interface, the seal compressed when the clamping device compresses together the flange and the portion of the second piece.

6. The battery assembly of claim 1, wherein the clamping device is separate and distinct from both the first and the second pieces.

7. The battery assembly of claim 1, wherein the clip is configured to be press-fit over the first and second flanges to transition the clip to an installed position where the clip compresses together the first and second flanges.

8. The battery assembly of claim 7, wherein an enlarged area of at least one of the first and second flanges is received within the interior area of the clip when the clip is in the installed position, the enlarged area blocking a transition of the clip from the installed position.

9. A battery assembly, comprising:
   first and second pieces of an enclosure;
   a flange of the first piece; and
   a clamping device compressing together the flange and a portion of the second piece to seal an interface between the first and second pieces, and having an interior area that receives the flange such that the clamping device extends continuously from a first side, about an outer edge, to an opposite, second side of the flange,
   wherein the flange is a first flange, and the portion of the second piece is a second flange, the clamping device extending continuously from a first side of the second flange, about an outer edge of the second flange, to an opposite, second side of the second flange,
   wherein the clamping device is a clip, the battery assembly further comprising an insert disposed within the interior area of the clip that is separate from the clip, the clip held by the insert in an expanded position when the insert is set, the clip moveable to a clamped position when the insert is released, wherein the insert is configured to release in response to at least one of the first or second flanges contacting the insert as the first and second flanges are moved relative to the clip into the interior area.

10. A battery assembly, comprising:
first and second pieces of an enclosure;
a flange of the first piece; and
a clamping device compressing together the flange and a portion of the second piece to seal an interface between the first and second pieces, and having an interior area that receives the flange such that the clamping device extends continuously from a first side, about an outer edge, to an opposite, second side of the flange,
wherein the clamping device is a continuous monolithic portion of the second piece.

11. A battery enclosure securing method, comprising:
holding a clamping device in an expanded position;
receiving a flange of a first enclosure piece within an open area of a clamping device while the clamping device compresses together the flange and a portion of a second enclosure piece, the clamping device extending continuously from a first side of the flange, about an outer edge of the flange, to an opposite, second side of the flange when the flange is received within the open area; and
during the receiving, contacting a component within an interior area of the clamping device to release the clamping device from the expanded position to a clamped position.

12. The battery enclosure securing method of claim 11, wherein the compressing seals an interface between the flange and the portion.

13. The battery enclosure securing method of claim 11, further comprising crimping the clamping device to compress together the flange and a portion of the second enclosure piece.

14. The battery enclosure securing method of claim 11, wherein the clamping device is separate and distinct from both the first and second pieces.

15. The battery enclosure securing method of claim 11, wherein the flange is a first flange, and the portion of the second piece is a second flange, and further comprising receiving the second flange within the open area while the clamping device compresses together the first and second flanges, the clamping device extending continuously from a first side of the second flange, about an outer edge of the second flange, to an opposite, second side of the second flange.

16. The battery enclosure securing method of claim 15, further comprising press-fitting the clamping device over the over the first and second flanges during the receiving to transition the clamping device to an installed position where the clamping device compresses together the first and second flanges.

17. The battery enclosure securing method of claim 16, further comprising blocking a transition of the clamping device from the installed position using an enlarged area of at least one of the first and second flanges that is received within the interior area of the clamping device when the clamping device is in the installed position.

18. The battery enclosure securing method of claim 11, wherein the component is an insert that is separate from the clip, the clip held by the insert in the expanded position when the insert is set, the clip moveable to the clamped position when the insert is released, wherein the insert releases in response to the contacting.

19. The battery enclosure securing method of claim 11, wherein the component is a trigger, the trigger holding the clamping device in the expanded position when the trigger is set, the clip moveable to the clamped position when the trigger is released, wherein the trigger releases in response to the contacting.

20. A battery enclosure securing method, comprising:
receiving a flange of a first enclosure piece within an open area of a clamping device while the clamping device compresses together the flange and a portion of a second enclosure piece, the clamping device extending continuously from a first side of the flange, about an outer edge of the flange, to an opposite, second side of the flange when the flange is received within the open area, wherein the clamping device is a continuous monolithic portion of the second piece.

* * * * *